(12) United States Patent
Inazaki et al.

(10) Patent No.: US 10,851,784 B2
(45) Date of Patent: Dec. 1, 2020

(54) OIL-FREE SCREW COMPRESSOR

(71) Applicant: Kobe Steel, Ltd., Hyogo (JP)

(72) Inventors: Mio Inazaki, Hyogo (JP); Toshiyuki Miyatake, Hyogo (JP); Yoshio Yano, Kobe (JP); Shoji Yoshimura, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 245 days.

(21) Appl. No.: 16/068,138

(22) PCT Filed: Dec. 5, 2016

(86) PCT No.: PCT/JP2016/086084
§ 371 (c)(1),
(2) Date: Jul. 5, 2018

(87) PCT Pub. No.: WO2017/122458
PCT Pub. Date: Jul. 20, 2017

(65) Prior Publication Data
US 2019/0024663 A1    Jan. 24, 2019

(30) Foreign Application Priority Data
Jan. 14, 2016 (JP) .................. 2016-005406

(51) Int. Cl.
*F04C 27/00* (2006.01)
*F04C 18/16* (2006.01)
(Continued)

(52) U.S. Cl.
CPC ............ *F04C 27/009* (2013.01); *F04C 18/16* (2013.01); *F16J 15/44* (2013.01); *F04C 29/02* (2013.01);
(Continued)

(58) Field of Classification Search
CPC ........ F04C 18/16; F04C 27/00; F04C 27/028; F04C 27/02; F04C 27/009; F04C 2240/20; F04C 2240/50; F04C 2240/60; F16J 15/44
See application file for complete search history.

(56) References Cited

U.S. PATENT DOCUMENTS 4,645,213 A  2/1987 Washimi et al.
5,125,672 A  6/1992 Wycliffe
(Continued)

FOREIGN PATENT DOCUMENTS

EP  1975411 A1 * 1/2008
JP  S61-011423 A  1/1986
(Continued)

OTHER PUBLICATIONS

International Search Report issued in PCT/JP2016/086084; dated Feb. 21, 2017.
(Continued)

*Primary Examiner* — Charles G Freay
(74) *Attorney, Agent, or Firm* — Studebaker & Brackett PC

(57) ABSTRACT

The oil-free screw compressor includes: a screw rotor, a bearing configured to support a rotor shaft, a shaft seal device including an oil seal arranged at a position closer to the bearing and a gas seal arranged on at a position closer to the rotor chamber, an atmosphere communication space communicating with an atmosphere communication hole, and an oil return groove including a return inclined surface inclined so as to expand in diameter radially outward from a gas seal-side end to an oil seal-side end. The oil seal portion is a viscoseal including a spiral groove portion. An inner peripheral surface of the oil seal includes an inner peripheral boundary portion that defines a part of the atmosphere communication space, on a side closer to the bearing
(Continued)

US 10,851,784 B2

Page 2 in the atmosphere communication hole. The oil seal-side end is arranged in a vicinity of the inner peripheral boundary portion and at a position closer to the bearing.

10 Claims, 10 Drawing Sheets

(51) Int. Cl.
*F16J 15/44* (2006.01)
*F04C 29/02* (2006.01)

(52) U.S. Cl.
CPC ...... *F04C 2240/50* (2013.01); *F04C 2240/60* (2013.01)

(56) References Cited

U.S. PATENT DOCUMENTS

| 5,295,798 | A | 3/1994 | Maruyama et al. | |
| 10,138,889 | B2 * | 11/2018 | Yano | F16J 15/3484 |
| 10,184,473 | B1 * | 1/2019 | Wagner | F04C 18/16 |
| 2004/0056423 | A1 * | 3/2004 | Staljanssens | F16J 15/004 |
| | | | | 277/305 |
| 2010/0253005 | A1 * | 10/2010 | Liarakos | F16J 15/406 |
| | | | | 277/353 |
| 2013/0075975 | A1 * | 3/2013 | Hilaris | F04C 15/0003 |
| | | | | 277/350 |
| 2017/0016446 | A1 | 1/2017 | Yano et al. | |

FOREIGN PATENT DOCUMENTS

| JP | 403186670 A | * | 8/1991 |
| JP | H03-186670 A | | 8/1991 |
| JP | 2009-287413 | * | 12/2009 |
| JP | 2015-169177 A | | 9/2015 |
| TW | 201544707 A | | 12/2015 |
| WO | 2015/136803 A1 | | 9/2015 |

OTHER PUBLICATIONS

International Preliminary Report on Patentability issued in corresponding International Application No. PCT/JP2016/086084, dated Jul. 26, 2018; with English translation.

* cited by examiner

OIL-FREE SCREW COMPRESSOR

CROSS-REFERENCE TO RELATED APPLICATIONS

This is a national phase application in the United States of International Patent application No. PCT/JP2016/086084 with an international filing date of Dec. 5, 2016, which claims priority of Japanese Patent Application No. 2016-005406 filed on Jan. 14, 2016. The contents of this application are incorporated herein by reference.

TECHNICAL FIELD

The present invention relates to an oil-free screw compressor.

BACKGROUND ART

Since an oil-free screw compressor does not supply lubricating oil into a rotor chamber, the oil-free screw compressor is more likely to leak a compressed gas than an oil-cooled screw compressor. This leakage of the compressed gas easily affects the compressor performance. Therefore, in oil-free screw compressors, a shaft seal device (gas seal) is used for preventing compressed gas from leaking from the area between a rotor shaft and a casing.

The oil-free screw compressor supplies lubricating oil to the bearing that supports the rotor shaft and the gear mechanism that transmits the rotational drive force from the drive source to the rotor shaft. When the rotor chamber has a negative pressure during unload operation, the lubricating oil supplied to the bearing and the like can flow into the rotor chamber. Thus, a shaft seal device (oil seal) is used for preventing the lubricating oil supplied to the bearing and the like from flowing into the rotor chamber.

An oil-free screw compressor including a gas seal and an oil seal as a shaft seal device is disclosed, for example, in Patent Document 1.

SUMMARY OF THE INVENTION

Problems to be Solved by the Invention

In the shaft seal device of the oil-free screw compressor disclosed in JP 2015-169177 A, a gas seal portion, an atmosphere communication hole, and an oil seal portion are arranged in order from the rotor chamber toward the bearings. Then, an oil return groove for returning the lubricating oil leaking from the oil seal portion toward the oil seal portion is provided at a position closer to the gas seal than the oil seal portion. The oil seal portion is formed in a narrow seal gap between the inner peripheral surface of the oil seal portion and the outer peripheral surface of the rotor shaft. The bottom surface portion of the oil return groove is an inclined surface which is inclined so as to expand in diameter radially outwardly toward the oil seal side. Then, the leaking lubricating oil is returned to the oil seal portion along the inclined surface of the oil return groove by the centrifugal force due to the rotation of the rotor shaft.

The inclined surface of the oil return groove extends from the gas seal-side end to the oil seal-side end, but the oil seal-side end terminates at a position closer to the gas seal than the oil seal portion. In order for the lubricating oil leaking from the oil seal portion to return to the oil seal portion, it is necessary to flow into the narrow seal gap (for example, several tens of μm) from the gas seal side.

Meanwhile, at a position closer to the gas seal than the oil seal portion, an atmosphere communication space is formed that is wider in the radial direction than a narrow seal gap and communicates with an atmosphere communication hole. Since the oil seal-side end of the oil return groove is located at a position closer to the gas seal than the oil seal portion, the lubricating oil may stay in the atmosphere communication space rather than flowing into the narrow seal gap of the oil seal portion, depending on the rotational speed of the rotor shaft. As a result, depending on the rotational speed of the rotor shaft, the oil return groove may fail to sufficiently exert the original function of returning the lubricating oil leaking from the oil seal portion toward the oil seal portion.

Therefore, in order to solve the technical problems, an object of the present invention is to provide an oil-free screw compressor that reliably returns, using the oil return groove, the lubricating oil leaking from the oil seal portion of the oil seal to the oil seal portion.

Solutions to the Problems

In order to solve the above technical problems, the present invention provides the following oil-free screw compressor.

That is, the oil-free screw compressor of the present invention includes: a screw rotor accommodated in a rotor chamber of a casing of a compressor; a bearing configured to support a rotor shaft of the screw rotor; a shaft seal device arranged in a shaft seal space of the casing, the shaft seal space being formed between the rotor chamber and the bearing, the shaft seal device including an oil seal arranged at a position closer to the bearing and a gas seal arranged at a position closer to the rotor chamber; an atmosphere communication space formed between an oil seal portion formed in any one of the oil seal and the rotor shaft and a gas seal portion of the gas seal, the atmosphere communication space communicating with an atmosphere communication hole; and an oil return groove formed on the rotor shaft, the oil return groove including a return inclined surface inclined so as to expand in diameter radially outward from a gas seal-side end to an oil seal-side end of the return inclined surface. The oil seal portion is a viscoseal including a spiral groove portion. An inner peripheral surface of the oil seal includes an inner peripheral boundary portion that defines a part of the atmosphere communication space, on a side closer to the bearing in the atmosphere communication hole. The oil seal-side end of the oil return groove is arranged in a vicinity of the inner peripheral boundary portion and at a position closer to the bearing.

Effect of the Invention

With the above configuration, the oil seal-side end of the oil return groove is arranged in the vicinity of the inner peripheral boundary portion on the inner peripheral surface of the oil seal and at a position closer to the bearing, whereby the oil return groove can guide the lubricating oil leaking from the viscoseal into the spiral groove portion of the viscoseal. Therefore, the oil return groove allows the lubricating oil leaking from the viscoseal to be reliably returned to the viscoseal.

EMBODIMENTS OF THE INVENTION

Figure 1:
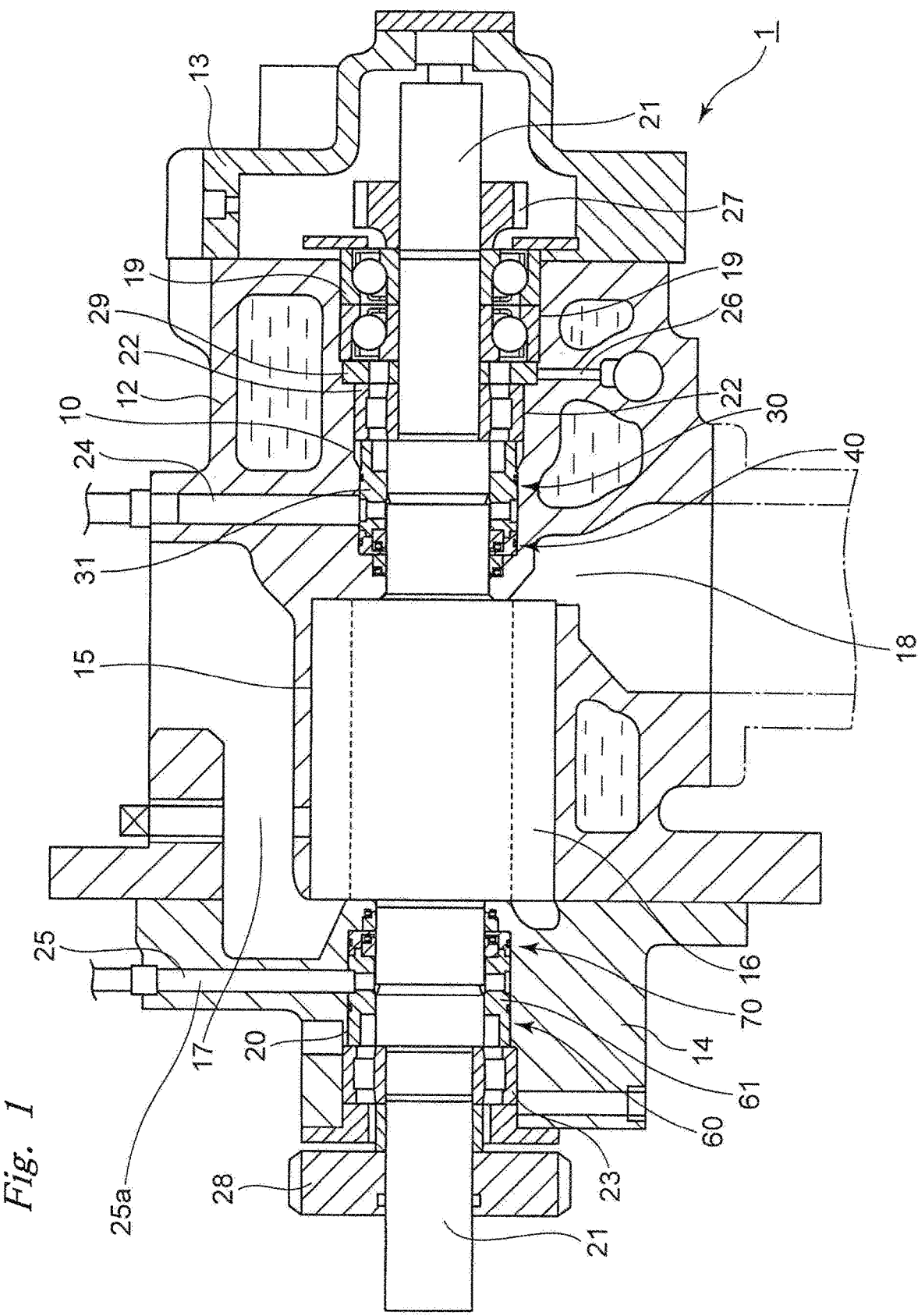
FIG. 1 is a longitudinal sectional view of an oil-free screw compressor according to an embodiment of the present invention.

First, an oil-free screw compressor 1 according to one embodiment of the present invention will be described with reference to FIG. 1.

The oil-free screw compressor 1 includes a casing including a casing body 12, a discharge-side casing 13, and a suction-side casing 14, and compresses the target gas by a pair of male and female screw rotors 16 intermeshing with each other and accommodated in a rotor chamber 15 of the casing.

The casing body 12 includes a suction port 17 that supplies a gas to be compressed to the rotor chamber 15 and a discharge port 18 that discharges the compressed gas compressed by the screw rotor 16 in the rotor chamber 15. The discharge-side casing 13 and the suction-side casing 14 are respectively attached to the discharge side and the suction side of the casing body 12. The discharge-side end and the suction-side end of the screw rotor 16 are provided with a rotor shaft 21. A driving gear 28 and a timing gear 27 are separately attached respectively to the end of the discharge-side rotor shaft 21 and the end of the suction-side rotor shaft 21. A rotational driving force of a motor (not shown) is transmitted to one screw rotor 16 via the driving gear 28, and the rotational driving force transmitted to the one screw rotor 16 is transmitted to the other screw rotor 16 via the timing gear 27. The pair of screw rotors 16 mesh with each other in a non-contact state to rotate, whereby the gas sucked from the suction port 17 is compressed to a predetermined pressure and then discharged from the discharge port 18.

On the discharge side of the casing body 12, a discharge-side shaft seal space 10 is formed. The discharge-side shaft seal space 10 is used for assembling a ball bearing (two-row angular contact ball bearing) 19 and a discharge-side bearing (roller bearing) 22 being bearings that rotatably support the discharge-side rotor shaft 21 and a discharge-side shaft seal device 30 being a shaft seal device that shaft-seals the discharge-side rotor shaft 21. In the suction-side casing 14, a suction-side shaft seal space 20 is formed. The suction-side shaft seal space 20 is used for assembling a suction-side bearing (roller bearing) 23 that rotatably supports the suction-side rotor shaft 21 and a suction-side shaft seal device 60 being a shaft seal device that shaft-seals the suction-side rotor shaft 21.

The casing body 12 is provided with an atmosphere opening hole 24a of an atmosphere opening passage 24 for communicating the outside (air side) of the casing body 12 to the discharge-side shaft seal space 10. The suction-side casing 14 is also provided with an atmosphere opening hole 25a of an atmosphere opening passage 25 for communicating the outside (air side) of the suction-side casing 14 to the suction-side shaft seal space 20. In addition, the casing body 12 is provided with an oil supply hole 26 for supplying lubricating oil to the bearings 19, 22, and 23 and the timing gear 27 described above.

The discharge-side shaft seal device 30 and the suction-side shaft seal device 60 respectively arranged in the discharge-side shaft seal space 10 and the suction-side shaft seal space 20 are configured substantially symmetrically in the axial direction with respect to the rotor chamber 15, and have the same configuration. Therefore, in the following, the discharge-side shaft seal device 30 will be described with reference to FIG. 2.

Figure 2:
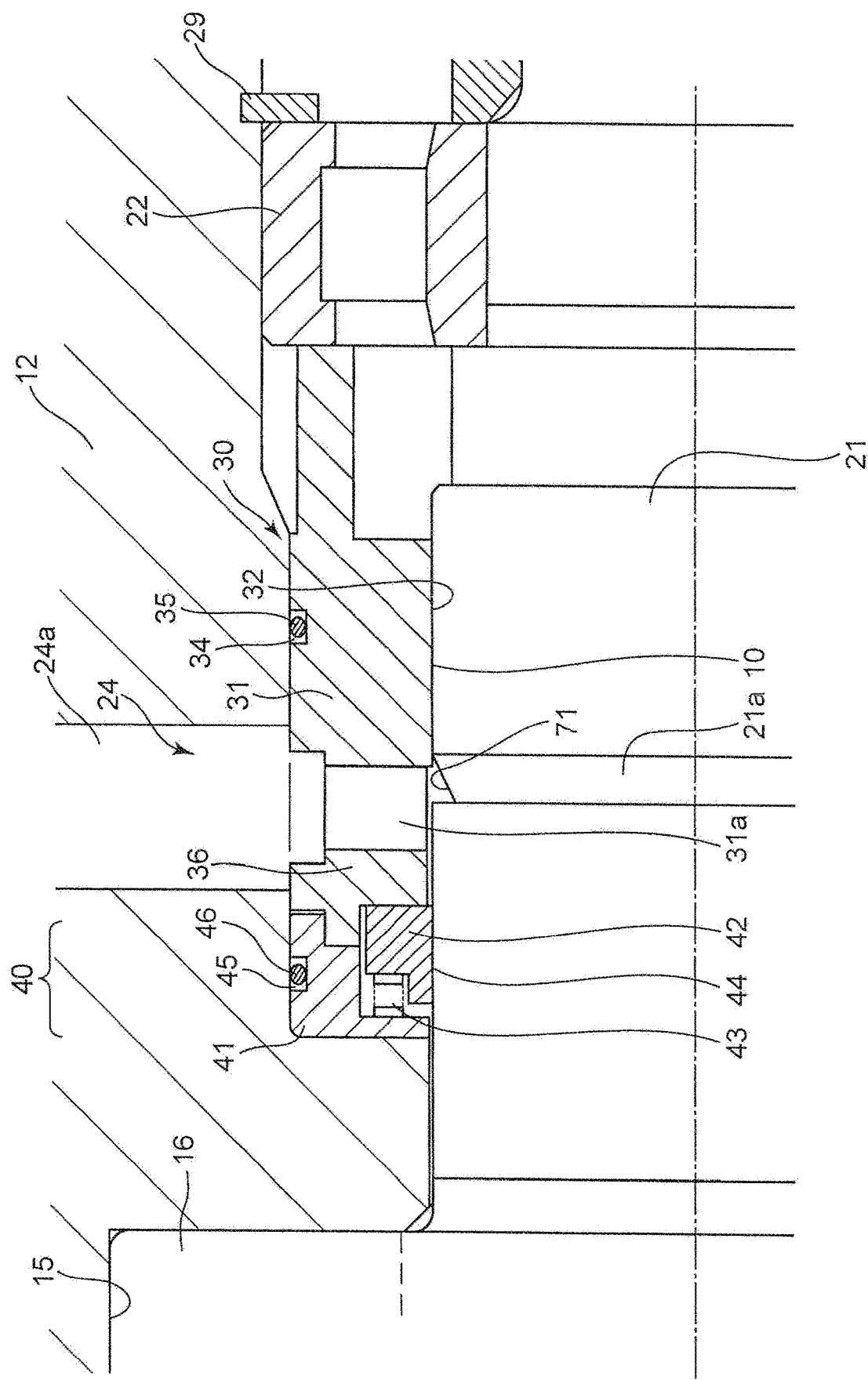
FIG. 2 is an enlarged sectional view showing a discharge-side shaft seal device of the compressor shown in FIG. 1.

FIG. 2 is an enlarged sectional view showing the discharge-side shaft seal device 30 of the oil-free screw compressor 1 shown in FIG. 1.

In the discharge-side shaft seal space 10, the discharge-side bearings 22 and the discharge-side shaft seal device 30 are arranged in order from the discharge-side bearings 22 side to the rotor chamber 15 side. The discharge-side shaft seal device 30 includes an oil seal 31 arranged on the discharge-side bearings 22 side and a gas seal 40 arranged on the rotor chamber 15 side. The oil seal 31 includes an oil seal portion 32 for cooperating with the rotor shaft 21, and the oil seal portion 32 seals the lubricating oil leaking from the discharge-side bearings 22. The gas seal 40 includes a gas seal portion 44 for cooperating with the rotor shaft 21, and the gas seal portion 44 seals the compressed gas leaking from the rotor chamber 15. An end of the discharge-side bearing 22 is restricted by a stopper 29, the ends being inserted into the discharge-side shaft seal space 10 and being on the side opposite to the rotor chamber 15.

An end 36 of the oil seal 31 has a fitting protrusion end having a cylindrical outer peripheral surface protruding toward the rotor chamber 15 side, the end 36 being on the rotor chamber 15 side. A first seal surface extending perpendicularly to the rotor shaft 21 is formed on a side surface of the end 36 of the oil seal 31, the side surface being on the rotor chamber 15 side.

The gas seal 40 includes a packing case 41, a seal ring 42, and an elastic body 43. A second seal surface extending perpendicularly to the rotor shaft 21 is formed on the side surface of the seal ring 42, the side surface being on the discharge-side bearings 22 side. The elastic body 43 is a metal member such as a wave spring, a wave washer, or a compression coil spring. The elastic force of the elastic body 43 causes the second seal surface of the seal ring 42 to be pressed against and supported by the first seal surface of the oil seal 31. The packing case 41 is made of a hard material such as stainless steel. Preferably, the packing case 41 is made of a material harder than that of the oil seal 31. The end of the packing case 41 has a fitting recess end having a cylindrical inner peripheral surface, the end of the packing case 41 being on the discharge-side bearings 22 side, the fitting recess end being configured to be fitted to the fitting protrusion end of the oil seal 31. In the discharge-side shaft seal device 30, the oil seal 31 and the gas seal 40 are connected and integrated by a fitting structure by interference fit of the fitting protrusion end and the fitting recess end to form a shaft seal device. An O-ring 35 is arranged in an annular recessed portion 34 formed along the peripheral direction on the outer peripheral surface of the oil seal 31. An O-ring 46 is arranged in an annular recessed portion 45 formed along the peripheral direction on the outer peripheral surface of the packing case 41.

A cylindrical gas seal housing space is formed with the inner wall surface of the packing case 41, the inner wall surface of the oil seal 31, and the outer peripheral surface 52 of the rotor shaft 21. The gas seal housing space accommodates the seal ring 42 and the elastic body 43. The seal ring 42 can move in the radial direction along the first seal surface of the oil seal 31. Even if eccentricity occurs between the seal ring 42 and the rotor shaft 21 due to deflection of the rotor shaft 21, the seal ring 42 moves radially following the rotor shaft 21, whereby the influence of eccentricity is eliminated. In addition, the seal ring 42 is arranged with a minute gas seal gap 44 with respect to the outer peripheral surface 52 of the rotor shaft 21. The gas seal gap 44 constitutes a gas seal portion of the gas seal 40. A pressure loss occurs in the compressed gas that tries to pass through the gas seal gap 44 between the inner peripheral surface of the seal ring 42 and the outer peripheral surface 52 of the rotor shaft 21, the shaft seal performance of reducing the leakage of the compressed gas is exhibited.

On any one of the inner peripheral surface 51 of the oil seal 31 or the outer peripheral surface 52 of the rotor shaft 21, a viscoseal 32 serving as a non-contact oil seal portion is formed. It should be noted that in FIG. 3 and subsequent drawings, the viscoseal 32 is schematically shown. Since the viscoseal 32 includes a fine spiral groove portion 62 (shown in FIGS. 3 to 13), the member including the viscoseal 32 is made of a metallic material which is easy to cut.

The casing body 12 (casing) has at least one atmosphere opening hole 24a. The atmosphere opening hole 24a communicates the shaft seal space 10 to the outside (air side) of the casing so as to penetrate the casing at a position closer to the bearings 22 than the position where the O-ring 46 is arranged. The discharge-side shaft seal device 30 (in the present embodiment, the oil seal 31 of the discharge-side shaft seal device 30) has a plurality of atmosphere communication holes 31a penetrating therethrough. The plurality of atmosphere communication holes 31a communicate with the atmosphere opening hole 24a via an annular communication groove which is wider than the hole diameter of the atmosphere communication hole 31a and which is provided on the outer periphery of the oil seal 31. The atmosphere opening passage 24 includes the atmosphere opening hole 24a, the atmosphere communication hole 31a, and the annular communication groove. In addition, an atmosphere communication space 55 is formed between the viscoseal 32 of the discharge-side shaft seal device 30 and the gas seal portion. The plurality of atmosphere communication holes 31a are formed so as to communicate with the atmosphere communication space 55 connecting the gas seal housing space and the viscoseal 32 on the inner peripheral side of the oil seal 31 of the discharge-side shaft seal device 30.

The atmosphere opening passage 24 opens the shaft seal space 10 corresponding to the discharge-side shaft seal device 30 into the atmosphere, the atmosphere opening passage 24 communicating the outside of the casing body 12 to the shaft seal space 10 corresponding to the discharge-side shaft seal device 30. Therefore, during unload operation, even when the rotor chamber 15 has a negative pressure and a force of sucking the lubricating oil in the discharge-side bearings 22 into the rotor chamber 15 acts, the atmosphere opening passage 24 opened into the atmosphere can prevent oil in the discharge-side bearings 22 from being sucked into the rotor chamber 15.

In addition, an oil return groove 21a is formed on the rotor shaft 21 at a position closer to the rotor chamber 15 with respect to the viscoseal 32. The oil return groove 21a has a return inclined surface 71 expanded in diameter radially outward from the rotor chamber 15 toward the discharge-side bearings 22. According to the oil return groove 21a, when the lubricating oil of the discharge-side bearings 22 leaks into the oil return groove 21a, the action of centrifugal force causes the lubricating oil to flow along the return inclined surface 71 and to be pushed back toward the viscoseal 32.

Next, the discharge-side shaft seal device 30 according to a first embodiment of the present invention will be described with reference to FIG. 3.

Figure 3:
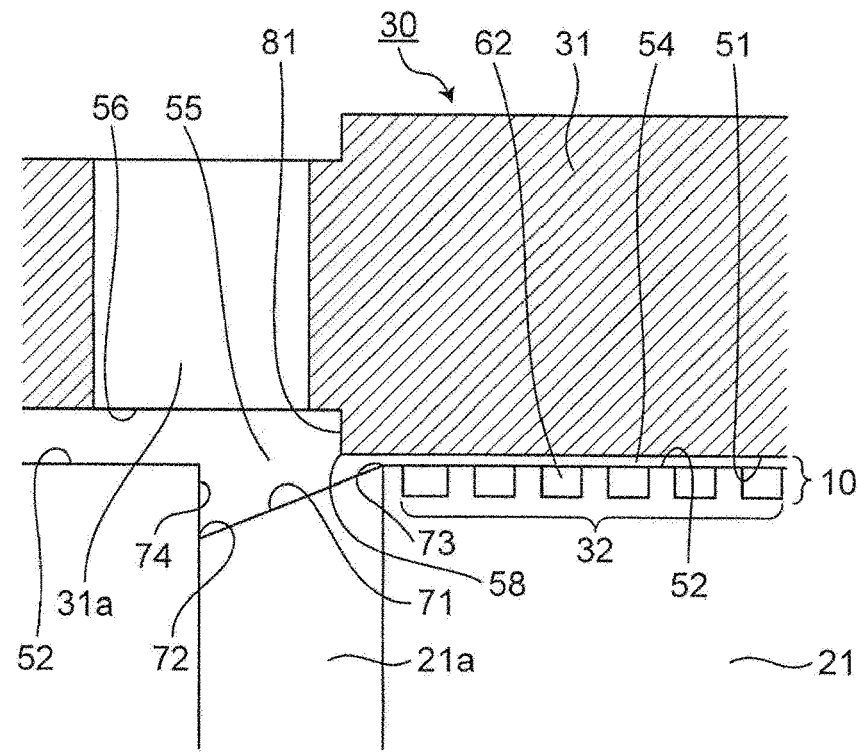
FIG. 3 is an enlarged cross-sectional view of a main part schematically showing a discharge-side shaft seal device according to a first embodiment of the present invention.

FIG. 3 is an enlarged view of a main part of the viscoseal 32 and the oil return groove 21a of the discharge-side shaft seal device 30.

The spiral groove portion 62 of the viscoseal 32 serving as the oil seal portion 32 is formed on the outer peripheral surface 52 of the rotor shaft 21. The spiral groove portion 62 shown in FIG. 3 has a rectangular shape in a cross sectional view. The spiral groove portion 62 is threaded so as to deliver the lubricating oil leaking from the discharge-side bearings 22 toward the discharge-side bearings 22. The rotation of the rotor shaft 21 causes a flow of fluid from the rotor chamber 15 side to the discharge-side bearings 22 side to occur in the spiral groove portion 62 of the viscoseal 32. As a result, the viscoseal 32 pushes back the lubricating oil leaking from the viscoseal 32 toward the discharge-side bearings 22. The spiral groove portion 62 is cut off from the oil seal-side end 73. The spiral groove portion 62 is, for example, in the form of a single thread screw, but it can also be in the form of a multiple thread screw. As a numerical value not limiting the present invention, for example, the groove width of the screw of the spiral groove portion 62 is 1 mm and the pitch is 1.5 mm.

On the rotor chamber 15 side of the viscoseal 32, the oil return groove 21a is formed on the outer peripheral surface 52 of the rotor shaft 21. The oil return groove 21a has a return inclined surface 71 inclined in a tapered shape so as to expand in diameter radially outward from the rotor chamber 15 side to the discharge-side bearings 22 side in a cross sectional view. The return inclined surface 71 extends from the gas seal-side end 72 (hereinafter, may be referred to as a gas seal-side end 72) to the oil seal-side end 73 (hereinafter, may be referred to as a viscoseal-side end 73). The gas seal-side end 72 is a portion where the groove-side end surface 74 and the return inclined surface 71 intersect.

The oil seal-side end 73 is a portion where the return inclined surface 71 and the outer peripheral surface 52 intersect.

In the portion facing the viscoseal 32 in the oil seal 31, the inner peripheral surface 51 extends in the axial direction. In the portion corresponding to the viscoseal 32 of the rotor shaft 21, the outer peripheral surface 52 extends in the axial direction. An oil seal gap 54 is formed between the inner peripheral surface 51 and the outer peripheral surface 52. The oil seal gap 54 communicates with the atmosphere communication space 55, but the gap of the oil seal gap 54 is very narrow (for example, several tens of μm), and thus the oil seal gap 54 restricts the flow of the lubricating oil leaking from the discharge-side bearings 22 toward the rotor chamber 15.

In the portion where the atmosphere communication hole 31a is provided on the inner peripheral side of the oil seal 31, the communication inner peripheral surface 56 extends in the axial direction. The communication inner peripheral surface 56 is positioned radially outward of the inner peripheral surface 51, and a step surface 81 extending in the axis orthogonal direction is formed at the boundary portion between the communication inner peripheral surface 56 and the inner peripheral surface 51. An inner peripheral boundary portion 58 is formed in a portion where the step surface 81 and the inner peripheral surface 51 intersect. The inner peripheral boundary portion 58 is formed, on the inner peripheral surface 51, on the side closer to the bearings 22 in the atmosphere communication hole 31a. The atmosphere communication space 55 includes, for example, a communication inner peripheral surface 56, a step surface 81, a return inclined surface 71, a groove-side end surface 74, and an outer peripheral surface 52, and is defined by them. The inner peripheral boundary portion 58 where the step surface 81 and the inner peripheral surface 51 intersect defines a part of the atmosphere communication space 55. Therefore, the inner peripheral surface 51 of the oil seal 31 includes the inner peripheral boundary portion 58 that defines a part of the atmosphere communication space 55, on the side closer to the bearings 22 in the atmosphere communication hole 31a.

The oil seal-side end 73 of the return inclined surface 71 is arranged in the vicinity of the inner peripheral boundary portion 58 positioned on the side closer to the bearings 22 in the atmosphere communication hole 31a, and at a position closer to the discharge-side bearings 22 than the inner peripheral boundary portion 58. When they are positioned in such a manner, the oil seal-side end 73 faces the inner peripheral surface 51 of the oil seal 31. The space formed by the return inclined surface 71 and the inner peripheral surface 51 has a shape tapering toward the discharge-side bearings 22. According to the tapering shape, the lubricating oil flowing toward the discharge-side bearings 22 along the return inclined surface 71 can easily flow into the oil seal gap 54. Therefore, the lubricating oil leaking from the viscoseal 32 can be reliably returned to the viscoseal 32 with the oil return groove 21a, and can be reliably returned to the discharge-side bearings 22.

In principle, when the oil seal-side end 73 is positioned slightly closer to the discharge-side bearings 22 with respect to the inner peripheral boundary portion 58, the above-described action and effect can be obtained. However, in reality, for example, the oil seal-side end 73 is arranged at a position closer to the discharge-side bearings 22 by a distance of at least one groove width of the spiral groove portion 62 (for example, a distance of 1 mm) from the inner peripheral boundary portion 58. Preferably, the oil seal-side end 73 is arranged at a position closer to the discharge-side bearings 22 by a distance of 1 mm to 5 mm from the inner peripheral boundary portion 58. That is, the return inclined surface 71 overlaps the inner peripheral surface 51 positioned closer to the discharge-side bearings 22 than the inner peripheral boundary portion 58. The oil seal-side end 73 can reliably be positioned closer to the discharge-side bearings 22 than the inner peripheral boundary portion 58 despite the assembly tolerance and the like of the discharge-side shaft seal device 30. There is no particular limitation as to how far the oil seal-side end 73 can be shifted to be arranged toward the discharge-side bearings 22. However, when the oil seal-side end 73 is excessively shifted toward the discharge-side bearings 22, the length in the axial direction of the viscoseal 32 becomes short. Therefore, the oil seal-side end 73 is shifted toward the discharge-side bearings 22 to be arranged within the range in which the oil sealing property of the viscoseal 32 is not affected.

Next, a discharge-side shaft seal device 30 according to a second embodiment of the present invention will be described with reference to FIG. 4. It should be noted that in the second embodiment, components having the same functions as the components in the first embodiment are denoted by the same reference numerals, and overlapping description will be omitted.

Figure 4:
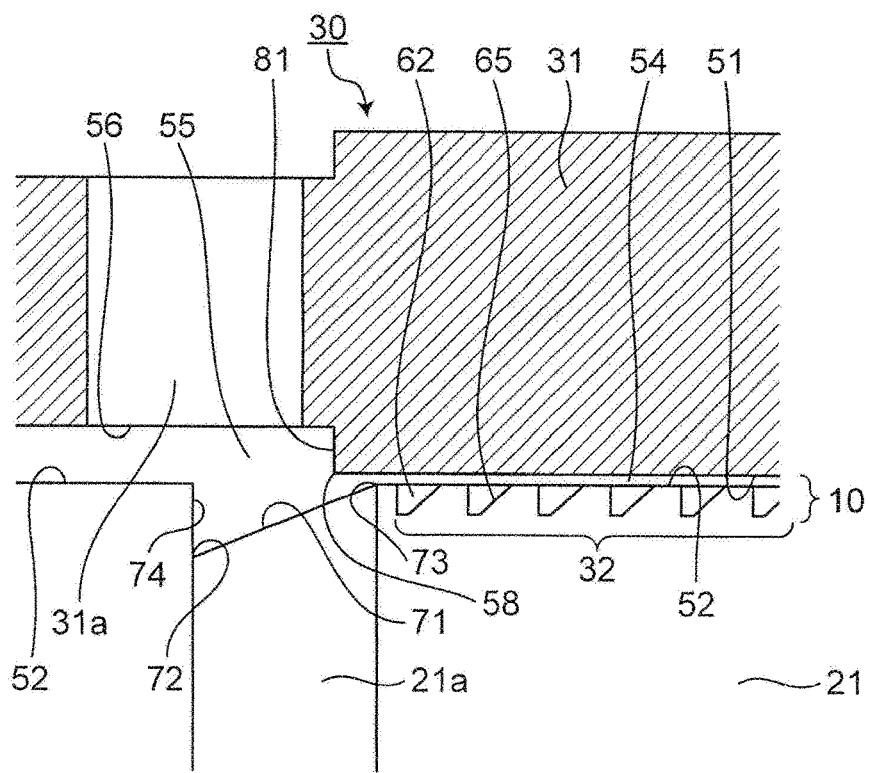
FIG. 4 is an enlarged cross-sectional view of a main part schematically showing a discharge-side shaft seal device according to a second embodiment of the present invention.

In the second embodiment, a spiral groove portion 62 of a viscoseal 32 has an inverted trapezoidal shape in a cross sectional view as shown in FIG. 4. The spiral groove portion 62 includes a spiral inclined surface 65 inclined so as to expand in diameter radially outward on the discharge-side bearings 22 side. With the spiral inclined surface 65, the lubricating oil existing in the spiral groove portion 62 flows along the spiral inclined surface 65 and is easily returned to the discharge-side bearings 22 due to the action of the centrifugal force when the rotor shaft 21 rotates. Therefore, the lubricating oil leaking from the viscoseal 32 can be reliably returned to the viscoseal 32, and furthermore, can be more reliably returned to the discharge-side bearings 22.

Next, a discharge-side shaft seal device 30 according to a third embodiment of the present invention will be described with reference to FIG. 5. It should be noted that in the third embodiment, components having the same functions as the components in the first embodiment are denoted by the same reference numerals, and overlapping description will be omitted.

Figure 5:
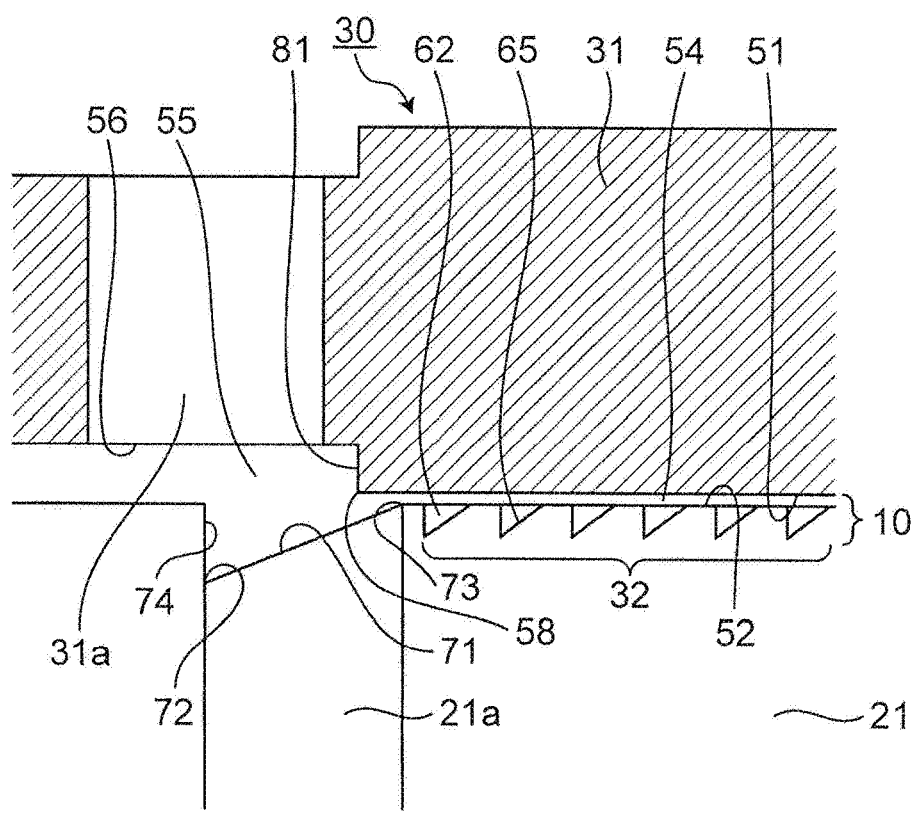
FIG. 5 is an enlarged cross-sectional view of a main part schematically showing a discharge-side shaft seal device according to a third embodiment of the present invention.

In the third embodiment, a spiral groove portion 62 of a viscoseal 32 has an inverted right triangle shape in a cross sectional view as shown in FIG. 5. The spiral groove portion 62 includes a spiral inclined surface 65 inclined so as to expand in diameter radially outward on the discharge-side bearings 22 side. With the spiral inclined surface 65, the lubricating oil existing in the spiral groove portion 62 flows along the spiral inclined surface 65 and is easily returned to the discharge-side bearings 22 due to the action of the centrifugal force when the rotor shaft 21 rotates. Therefore, the lubricating oil leaking from the viscoseal 32 can be reliably returned to the viscoseal 32, and furthermore, can be more reliably returned to the discharge-side bearings 22.

Figure 6:
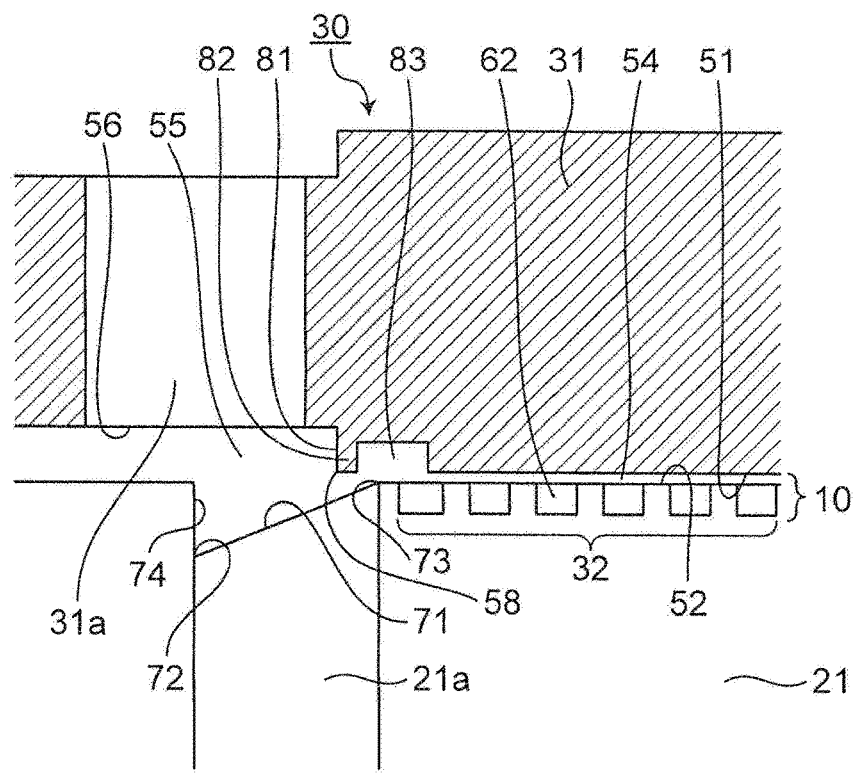
FIG. 6 is an enlarged cross-sectional view of a main part schematically showing a discharge-side shaft seal device according to a fourth embodiment of the present invention.

Next, a discharge-side shaft seal device 30 according to a fourth embodiment of the present invention will be described with reference to FIG. 6. It should be noted that in the fourth embodiment, components having the same functions as the components in the first embodiment are denoted by the same reference numerals, and overlapping description will be omitted.

In the fourth embodiment, an annular groove 83 having a rectangular shape in a cross sectional view is arranged in the vicinity of the inner peripheral boundary portion 58 on the inner peripheral surface 51 of the oil seal 31. On the inner peripheral surface 51 of the oil seal 31, a wall portion 82 and the annular groove 83 are arranged in order in the axial direction from the inner peripheral boundary portion 58 toward the discharge-side bearings 22. Then, the oil seal-side end 73 is arranged so as to face the annular groove 83. In addition, a spiral groove portion 62 shown in FIG. 6 has a rectangular shape in a cross-sectional view. As numerical values not limiting the present invention, the widths in the axial direction of the wall portion 82 and the annular groove 83 are, for example, 0.5 mm and 1.5 mm, respectively.

According to this configuration, the lubricating oil flowing along the return inclined surface 71 and pushed back toward the viscoseal 32 temporarily flows into the annular groove 83 and is stored therein, so that it becomes difficult for the lubricating oil to return to the atmosphere communication space 55 separated by the wall portion 82. The lubricating oil flowing into the annular groove 83 is pushed back toward the discharge-side bearings 22 with the spiral groove portion 62 facing the annular groove 83. Therefore, the lubricating oil leaking from the viscoseal 32 can be more reliably returned to the viscoseal 32, and can be reliably returned to the discharge-side bearings 22.

Next, a discharge-side shaft seal device 30 according to a fifth embodiment of the present invention will be described with reference to FIG. 7. It should be noted that in the fifth embodiment, components having the same functions as the components in the fourth embodiment are denoted by the same reference numerals, and overlapping description will be omitted.

Figure 7:
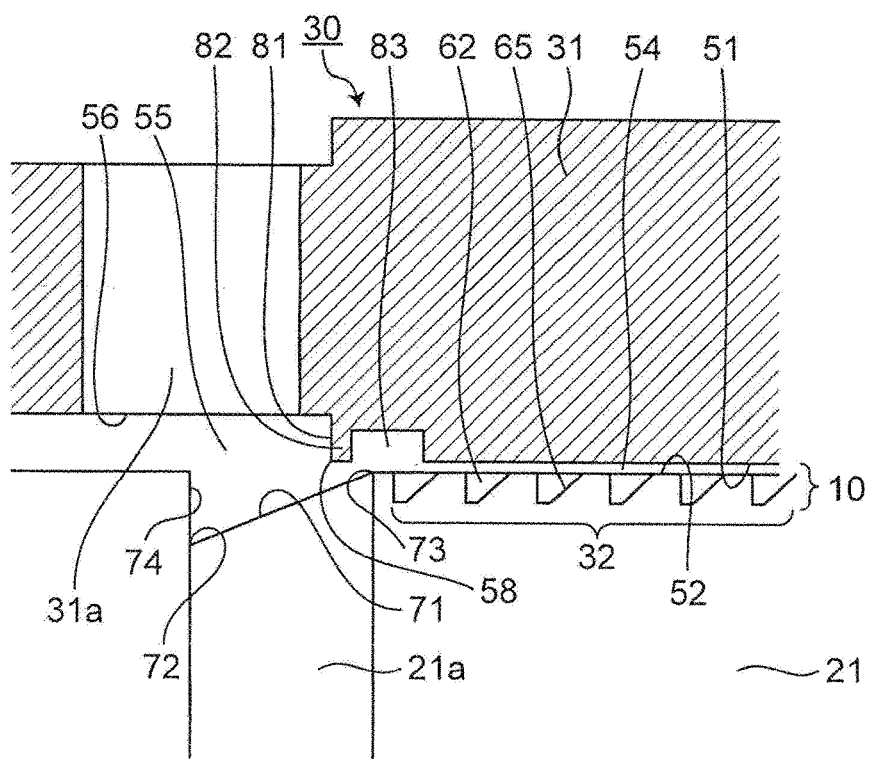
FIG. 7 is an enlarged cross-sectional view of a main part schematically showing a discharge-side shaft seal device according to a fifth embodiment of the present invention.

In the fifth embodiment, a spiral groove portion 62 of a viscoseal 32 has an inverted trapezoidal shape in a cross sectional view as shown in FIG. 7. The spiral groove portion 62 includes a spiral inclined surface 65 inclined so as to expand in diameter radially outward on the discharge-side bearings 22 side. With the spiral inclined surface 65, the lubricating oil existing in the spiral groove portion 62 flows along the spiral inclined surface 65 and is easily returned to the discharge-side bearings 22 due to the action of the centrifugal force when the rotor shaft 21 rotates. Therefore, the lubricating oil leaking from the viscoseal 32 can be more reliably returned to the viscoseal 32, and furthermore, can be more reliably returned to the discharge-side bearings 22.

Next, a discharge-side shaft seal device 30 according to a sixth embodiment of the present invention will be described in detail with reference to FIG. 8. It should be noted that in the sixth embodiment, components having the same functions as the components in the fourth embodiment are denoted by the same reference numerals, and overlapping description will be omitted.

Figure 8:
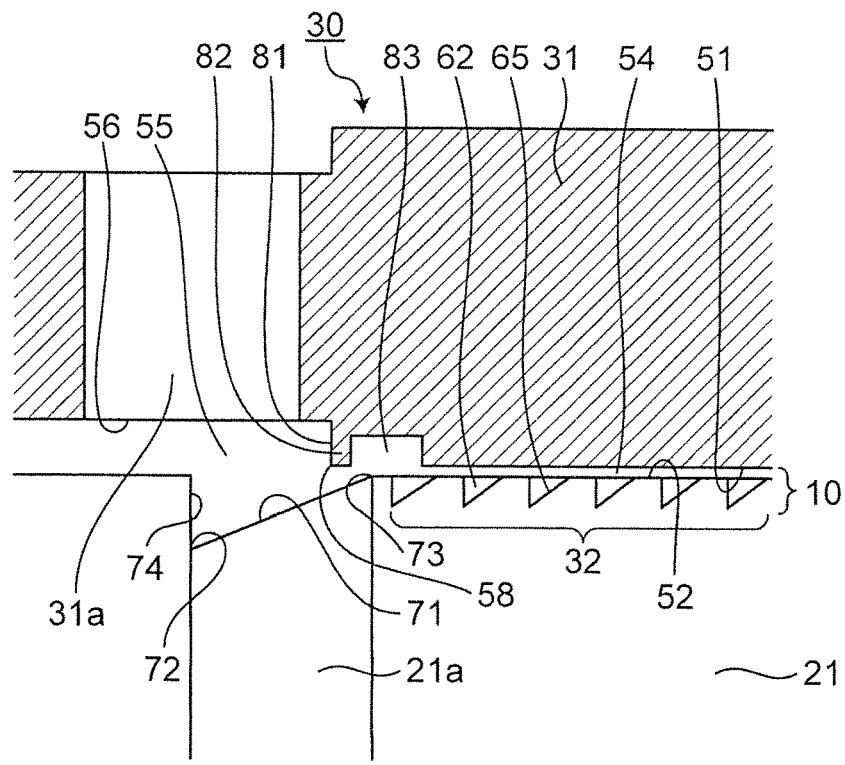
FIG. 8 is an enlarged cross-sectional view of a main part schematically showing a discharge-side shaft seal device according to a sixth embodiment of the present invention.

In the sixth embodiment, the spiral groove portion 62 of the viscoseal 32 has an inverted right triangle shape in a cross sectional view as shown in FIG. 8. The spiral groove portion 62 includes a spiral inclined surface 65 inclined so as to expand in diameter radially outward on the discharge-side bearings 22 side. With the spiral inclined surface 65, the lubricating oil existing in the spiral groove portion 62 flows along the spiral inclined surface 65 and is easily returned to the discharge-side bearings 22 due to the action of the centrifugal force when the rotor shaft 21 rotates. Therefore, the lubricating oil leaking from the viscoseal 32 can be more reliably returned to the viscoseal 32, and furthermore, can be more reliably returned to the discharge-side bearings 22.

Figure 9:
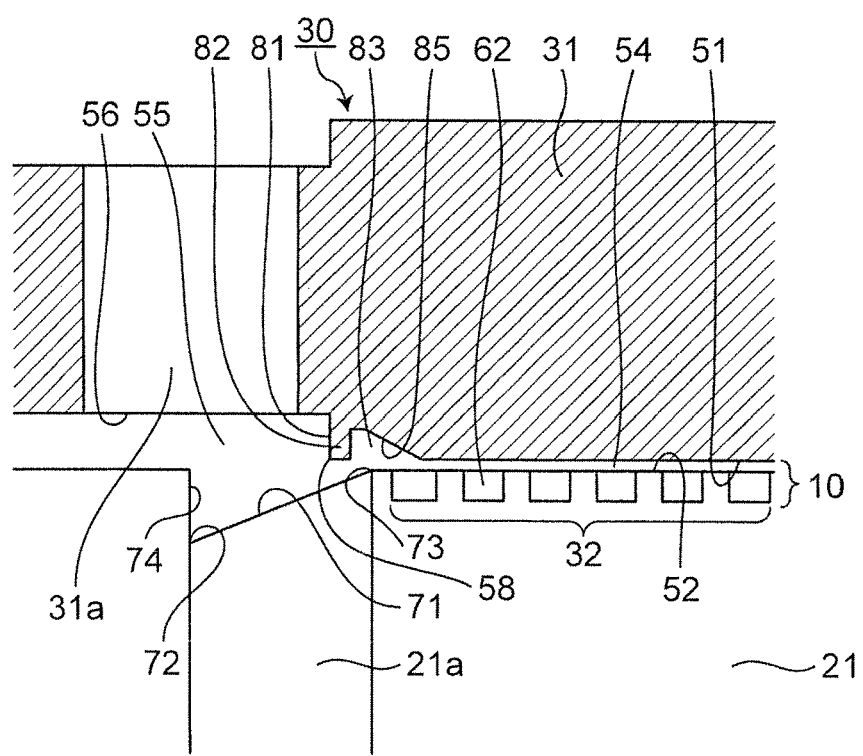
FIG. 9 is an enlarged cross-sectional view of a main part schematically showing a discharge-side shaft seal device according to a seventh embodiment of the present invention.

Next, a discharge-side shaft seal device 30 according to a seventh embodiment of the present invention will be described with reference to FIG. 9. It should be noted that in the seventh embodiment, components having the same functions as the components in the fourth embodiment are denoted by the same reference numerals, and overlapping description will be omitted.

In the seventh embodiment, an annular groove 83 having a trapezoidal shape in a cross sectional view is arranged in the vicinity of the inner peripheral boundary portion 58 on the inner peripheral surface 51 of the oil seal 31. On the inner peripheral surface 51 of the oil seal 31, the wall portion 82 and the annular groove 83 are formed in order in the axial direction from the inner peripheral boundary portion 58 toward the discharge-side bearings 22. The annular groove 83 having a trapezoidal shape in a cross sectional view has an annular inclined surface 85 inclined so as to decrease in diameter radially inward on the discharge-side bearings 22 side. The annular inclined surface 85 guides the lubricating oil flowing into the annular groove 83 so that the lubricating oil flows toward the discharge-side bearings 22 along the annular inclined surface 85 when the rotor shaft 21 rotates. Then, the oil seal-side end 73 is arranged so as to face the annular groove 83. In addition, the spiral groove portion 62 shown in FIG. 9 has a rectangular shape in a cross-sectional view.

According to this configuration, the lubricating oil flowing along the return inclined surface 71 and pushed back toward the viscoseal 32 temporarily flows into the annular groove 83 and is stored therein, so that it becomes difficult for the lubricating oil to return to the atmosphere communication space 55 separated by the wall portion 82. The lubricating oil flowing into the annular groove 83 is guided toward the discharge-side bearings 22 with the annular inclined surface 85 and pushed back toward the discharge-side bearings 22 with the spiral groove portion 62 facing the annular groove 83. Therefore, the lubricating oil leaking from the viscoseal 32 can be more reliably returned to the viscoseal 32, and can be reliably returned to the discharge-side bearings 22.

Next, a discharge-side shaft seal device 30 according to an eighth embodiment of the present invention will be described with reference to FIG. 10. It should be noted that in the eighth embodiment, components having the same functions as the components in the seventh embodiment are denoted by the same reference numerals, and overlapping description will be omitted.

Figure 10:
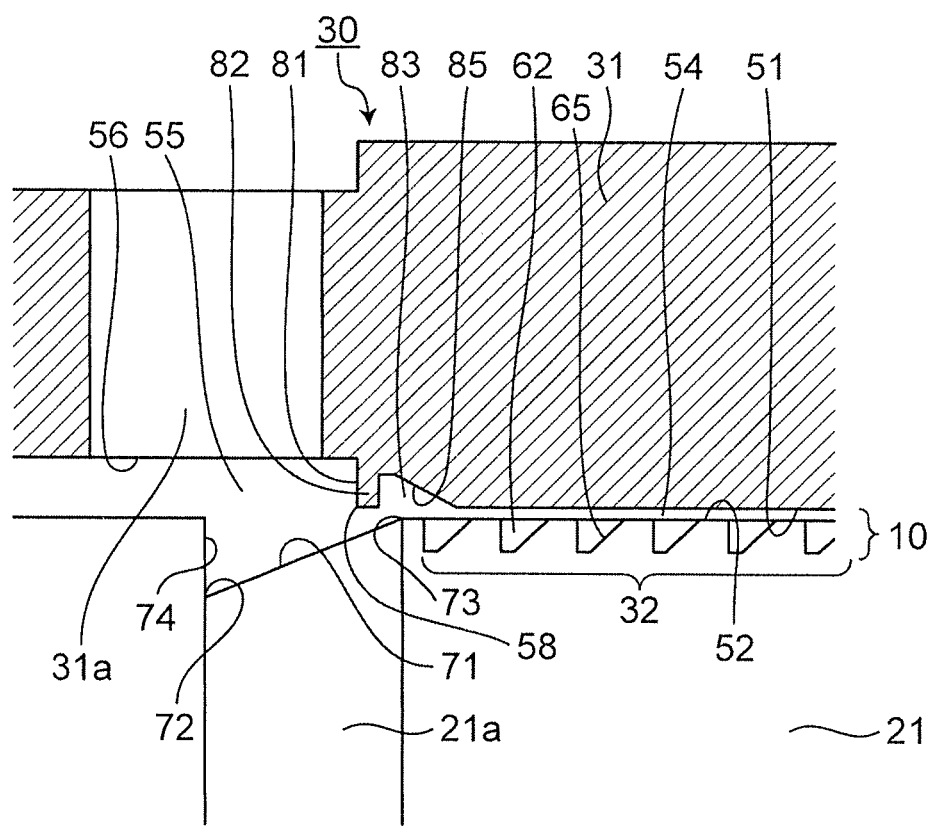
FIG. 10 is an enlarged cross-sectional view of a main part schematically showing a discharge-side shaft seal device according to an eighth embodiment of the present invention.

In the eighth embodiment, the annular groove 83 includes the annular inclined surface 85, and a spiral groove portion 62 of a viscoseal 32 has an inverted trapezoidal shape in a cross sectional view as shown in FIG. 10. The spiral groove portion 62 includes a spiral inclined surface 65 inclined so as to expand in diameter radially outward on the discharge-side bearings 22 side. The lubricating oil flowing into the annular groove 83 with the return inclined surface 71 is guided to the discharge-side bearings 22 with the annular inclined surface 85. Then, with the spiral inclined surface 65, the lubricating oil existing in the spiral groove portion 62 flows along the spiral inclined surface 65 and is pushed back toward the discharge-side bearings 22 due to the action of the centrifugal force when the rotor shaft 21 rotates. Therefore, the lubricating oil leaking from the viscoseal 32 can be more reliably returned to the viscoseal 32, and furthermore, can be more reliably returned to the discharge-side bearings 22.

Next, a discharge-side shaft seal device 30 according to a ninth embodiment of the present invention will be described with reference to FIG. 11. It should be noted that in the ninth embodiment, components having the same functions as the components in the seventh embodiment are denoted by the same reference numerals, and overlapping description will be omitted.

Figure 11:
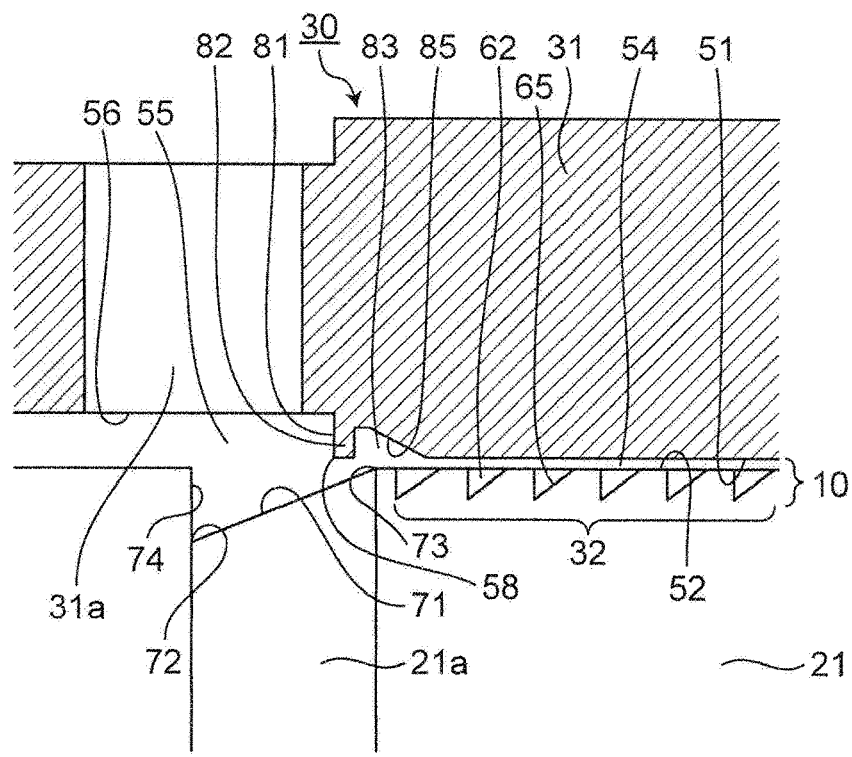
FIG. 11 is an enlarged cross-sectional view of a main part schematically showing a discharge-side shaft seal device according to a ninth embodiment of the present invention.

In the ninth embodiment, the annular groove 83 includes the annular inclined surface 85, and a spiral groove portion 62 of a viscoseal 32 has an inverted right triangle shape in a cross sectional view as shown in FIG. 11. The spiral groove portion 62 includes a spiral inclined surface 65 inclined so as to expand in diameter radially outward on the discharge-side bearings 22 side. The lubricating oil flowing into the annular groove 83 with the return inclined surface 71 is guided to the discharge-side bearings 22 with the annular inclined surface 85. Then, with the spiral inclined surface 65, the lubricating oil existing in the spiral groove portion 62 flows along the spiral inclined surface 65 and is pushed back toward the discharge-side bearings 22 due to the action of the centrifugal force when the rotor shaft 21 rotates. Therefore, the lubricating oil leaking from the viscoseal 32 can be more reliably returned to the viscoseal 32, and furthermore, can be more reliably returned to the discharge-side bearings 22.

It should be noted that in the seventh embodiment to the ninth embodiment, there may be a mode in which the annular groove 83 has a right triangle shape in a cross sectional view, and includes an annular inclined surface 85 inclined so as to decrease in diameter radially inward on the discharge-side bearings 22 side.

Figure 12:
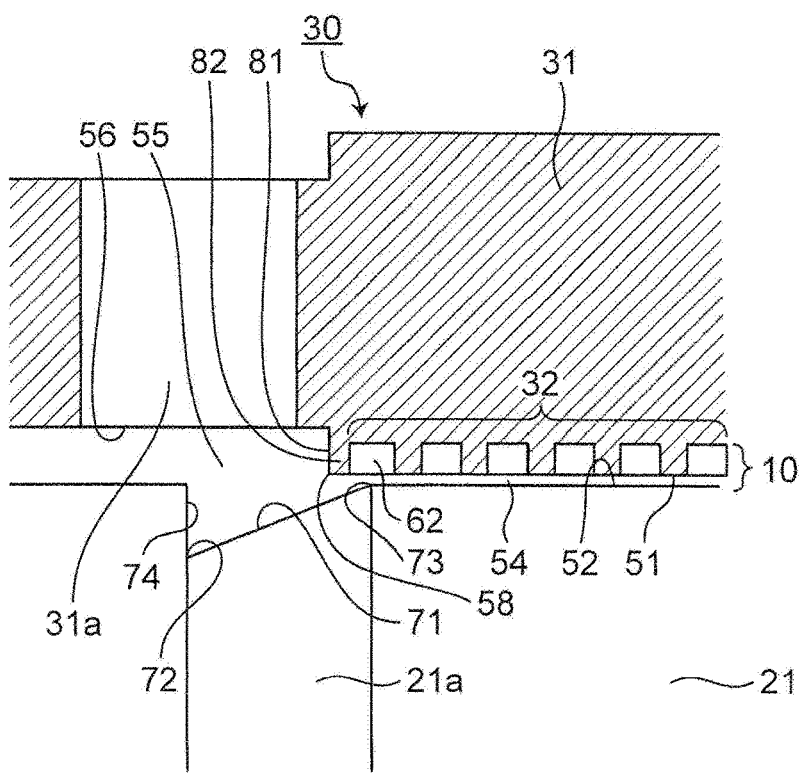
FIG. 12 is an enlarged cross-sectional view of a main part schematically showing a discharge-side shaft seal device according to a tenth embodiment of the present invention.

Next, a discharge-side shaft seal device 30 according to a tenth embodiment of the present invention will be described with reference to FIG. 12. It should be noted that in the tenth embodiment, components having the same functions as the components in the first embodiment are denoted by the same reference numerals, and overlapping description will be omitted.

In the tenth embodiment, the spiral groove portion 62 of the viscoseal 32 serving as the oil seal portion 32 is formed on the inner peripheral surface 51 of the discharge-side shaft seal device 30 (the oil seal 31 in the present embodiment). The spiral groove portion 62 shown in FIG. 12 has a rectangular shape in a cross sectional view. The spiral groove portion 62 is threaded so as to deliver the lubricating oil leaking from the discharge-side bearings 22 toward the discharge-side bearings 22. The spiral groove portion 62 is threaded from the inner peripheral boundary portion 58, but there may be a mode in which threading is performed from the discharge-side bearings 22 on the side opposite to the inner peripheral boundary portion 58 to form the wall portion 82. In addition, as in the second embodiment and the like, the spiral groove portion 62 may include a spiral inclined surface 65 inclined so as to expand in diameter radially outward on the discharge-side bearings 22 side.

The oil seal-side end 73 of the return inclined surface 71 is arranged so as to face the inner peripheral surface 51 of the oil seal 31, on the discharge-side bearings 22 side, in the vicinity of the inner peripheral boundary portion 58 positioned on the side closer to the bearings 22 in the atmosphere communication hole 31a. That is, the return inclined surface 71 overlaps the inner peripheral surface 51 positioned closer to the discharge-side bearings 22 than the inner peripheral boundary portion 58. The space formed by the return inclined surface 71 and the inner peripheral surface 51 has a shape tapering toward the discharge-side bearings 22. According to this configuration, the lubricating oil flowing toward the discharge-side bearings 22 along the return inclined surface 71 easily flows into the oil seal gap 54 and is supplied to the spiral groove portion 62 of the viscoseal 32. Therefore, the lubricating oil leaking from the viscoseal 32 can be reliably returned to the viscoseal 32 with the oil return groove 21a, and can be reliably returned to the discharge-side bearings 22.

Figure 13:
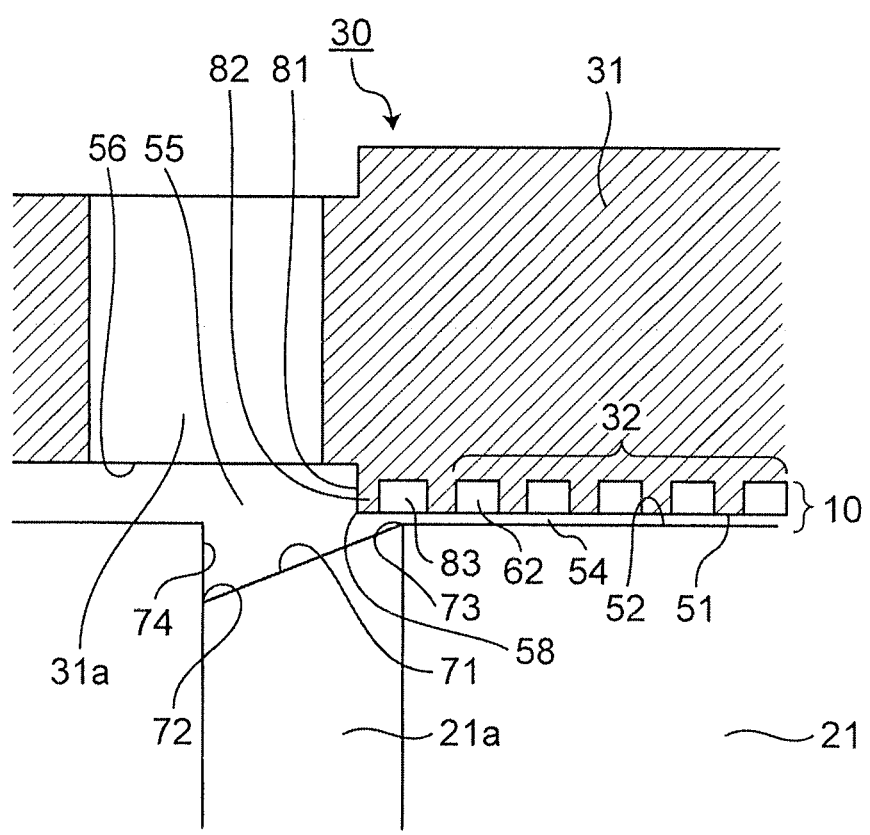
FIG. 13 is an enlarged cross-sectional view of a main part schematically showing a discharge-side shaft seal device according to an eleventh embodiment of the present invention.

Next, a discharge-side shaft seal device 30 according to an eleventh embodiment of the present invention will be described with reference to FIG. 13. It should be noted that in the eleventh embodiment, components having the same functions as the components in the first embodiment are denoted by the same reference numerals, and overlapping description will be omitted.

The eleventh embodiment is similar to the tenth embodiment in that the return inclined surface 71 overlaps the inner peripheral surface 51 positioned closer to the discharge-side bearings 22 than the inner peripheral boundary portion 58. However, in the eleventh embodiment, an annular groove 83 and a spiral groove portion 62 that each have a rectangular shape in a cross sectional view are arranged in the vicinity of the inner peripheral boundary portion 58 on the inner peripheral surface 51 of the oil seal 31. On the inner peripheral surface 51 of the oil seal 31, a wall portion 82, an annular groove 83, and a spiral groove portion 62 are arranged in order in the axial direction from the inner peripheral boundary portion 58 toward the discharge-side bearings 22. Then, the oil seal-side end 73 is arranged so as to face the annular groove 83. The annular groove 83 and the spiral groove portion 62 shown in FIG. 13 each have a rectangular shape in a cross sectional view. The spiral groove portion 62 is threaded from the annular groove 83 and communicates with the annular groove 83.

According to this configuration, the lubricating oil flowing along the return inclined surface 71 and pushed back toward the viscoseal 32 temporarily flows into the annular groove 83 and is stored therein, so that it becomes difficult for the lubricating oil to return to the atmosphere communication space 55 separated by the wall portion 82. The lubricating oil flowing into the annular groove 83 is pushed back toward the discharge-side bearings 22 with the spiral groove portion 62 communicating with the annular groove 83. Therefore, the lubricating oil leaking from the viscoseal 32 can be more reliably returned to the viscoseal 32, and can be reliably returned to the discharge-side bearings 22. It should be noted that the annular groove 83 and the spiral groove portion 62 may respectively include an annular inclined surface 85 and a spiral inclined surface 65 inclined so as to expand in diameter radially outward on the discharge-side bearings 22 side.

Figure 14:
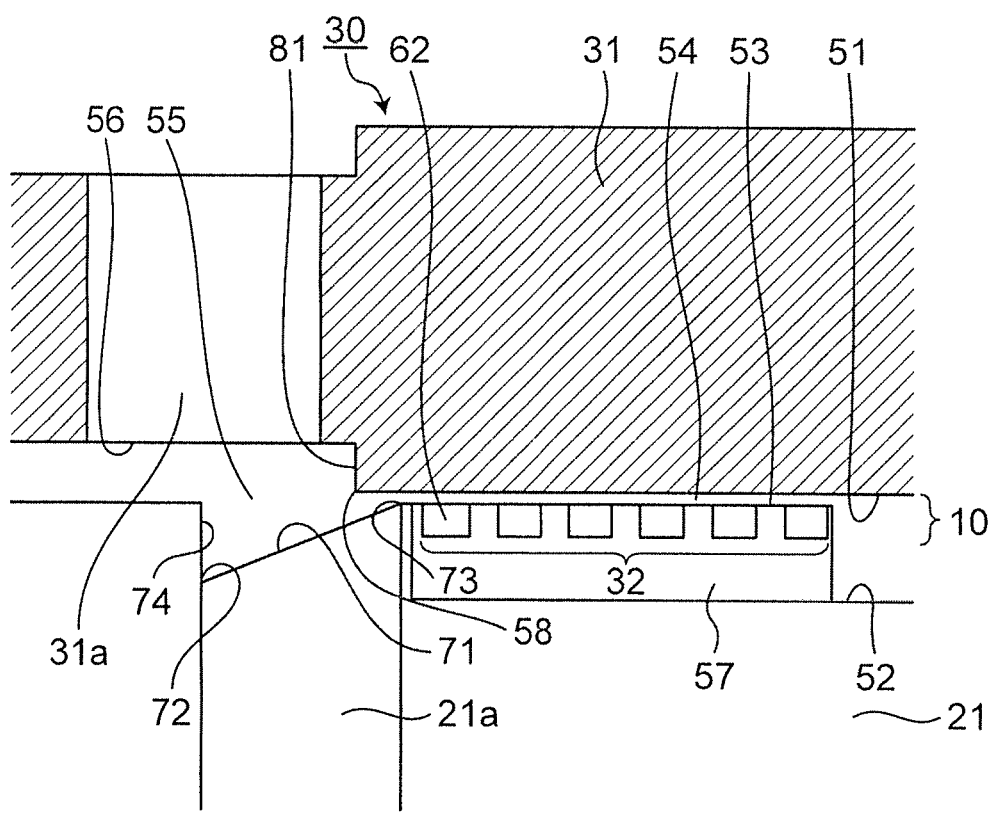
FIG. 14 is an enlarged cross-sectional view of a main part schematically showing a discharge-side shaft seal device according to a twelfth embodiment of the present invention.

Next, a discharge-side shaft seal device 30 according to a twelfth embodiment of the present invention will be described with reference to FIG. 14. It should be noted that in the twelfth embodiment, components having the same functions as the components in the first embodiment are denoted by the same reference numerals, and overlapping description will be omitted.

In the twelfth embodiment, a spiral groove portion 62 of a viscoseal 32 is formed on a sleeve outer peripheral surface 53 of a sleeve 57. The sleeve 57 is detachably attached to the outer peripheral surface 52 of the rotor shaft 21 with an interference fit structure, a reverse screw structure, a stopper structure for restricting the end located at a position closer to the discharge-side bearings 22 with a stopper, or the like. The spiral groove portion 62 shown in FIG. 14 has a rectangular shape in a cross sectional view. The spiral groove portion 62 is threaded so as to deliver the lubricating oil leaking from the discharge-side bearings 22 toward the discharge-side bearings 22. An oil seal gap 54 is formed between the inner peripheral surface 51 and the sleeve outer peripheral surface 53. In addition, as in the second embodiment and the like, the spiral groove portion 62 may include a spiral inclined surface 65 inclined so as to expand in diameter radially outward on the discharge-side bearings 22 side. Forming the spiral groove portion 62 of the viscoseal 32 on the separate sleeve 57 allows a metallic material, which is easily subjected to cutting processing for the fine spiral groove portion 62, to be used as the sleeve 57, and the machining cost of the spiral groove portion 62 to be reduced.

The oil seal-side end 73 of the return inclined surface 71 is arranged so as to face the inner peripheral surface 51 of the oil seal 31, on the discharge-side bearings 22 side, in the vicinity of the inner peripheral boundary portion 58 positioned on the bearings 22 side of the atmosphere communication hole 31a. The lubricating oil flowing toward the discharge-side bearings 22 along the return inclined surface 71 flows into the oil seal gap 54. Then, the lubricating oil flowing into the oil seal gap 54 is pushed back toward the discharge-side bearings 22 by the spiral groove portion 62 of the sleeve 57. Therefore, the lubricating oil leaking from the viscoseal 32 can be reliably returned to the viscoseal 32, and furthermore, can be reliably returned to the discharge-side bearings 22.

It should be noted that in each of the above embodiments, the discharge-side shaft seal device 30 of the oil-free screw compressor 1 has been described, but the present invention can also be applied to the suction-side shaft seal device 60 including the oil seal 61 and the gas seal 70. The gas seal structure in the shaft seal device 30 or 60 is not limited to the above embodiments, and the number of the gas seals 40 or 70 can be appropriately changed, that is, to two or more. As a gas seal, a known seal member such as a labyrinth seal or the like can be used instead of the seal ring 42.

In each of the above embodiments, the communication inner peripheral surface 56 is positioned radially outward of the inner peripheral surface 51, and the portion where the step surface 81 and the communication inner peripheral surface 56 intersect is an inner peripheral boundary portion 58. However, there may be a mode where the communication inner peripheral surface 56 and the inner peripheral surface 51 extend in the same plane in the axial direction and include no step surface 81. In this case, the atmosphere communication space 55 includes a communication inner peripheral surface 56, a return inclined surface 71, a groove-side end surface 74, and an outer peripheral surface 52, and is defined by them. The inner peripheral boundary portion 58 is a portion where the axis orthogonal plane on the bearings 22 side in the atmosphere communication hole 31a and the inner peripheral surface 51 intersect. Then, this inner peripheral boundary portion 58 defines a part of the atmosphere communication space 55.

As apparent from the above description, the oil-free screw compressor 1 according to the present invention includes: a screw rotor 16 accommodated in a rotor chamber 15 of a casing 12 of a compressor, a bearing 22 configured to support a rotor shaft 21 of the screw rotor 16, a shaft seal device 30 arranged in a shaft seal space 10 of the casing 12, the shaft seal space 10 being formed between the rotor chamber 15 and the bearing 22, the shaft seal device 30 including an oil seal 31 arranged at a position closer to the bearing 22 and a gas seal 40 arranged at a position closer to the rotor chamber 15, an atmosphere communication space 55 formed between an oil seal portion 32 formed in any one of the oil seal 31 and the rotor shaft 21 and a gas seal portion 44 of the gas seal 40, the atmosphere communication space 55 communicating with an atmosphere communication hole 31a, and an oil return groove 21a formed on the rotor shaft 21, the oil return groove 21a including a return inclined surface 71 inclined so as to expand in diameter radially outward from a gas seal-side end 72 to an oil seal-side end 73 of the return inclined surface 71; the oil seal portion 32 is a viscoseal 32 including a spiral groove portion 62; an inner peripheral surface 51 of the oil seal 31 includes an inner peripheral boundary portion 58 that defines a part of the atmosphere communication space 55, on a side closer to the bearing 22 in the atmosphere communication hole 31a; and the oil seal-side end 73 of the oil return groove 21a is arranged in a vicinity of the inner peripheral boundary portion 58 and at a position closer to the bearing 22.

With the above configuration, the oil seal-side end 73 of the oil return groove 21a is arranged in the vicinity of the inner peripheral boundary portion 58 on the inner peripheral surface 51 of the oil seal 31 and at a position closer to the bearing 22, whereby the oil return groove 21a can guide the lubricating oil leaking from the viscoseal 32 into the spiral groove portion 62 of the viscoseal 32. Therefore, the oil return groove 21a allows the lubricating oil leaking from the viscoseal 32 to be reliably returned to the viscoseal 32.

In addition to the above features, the present invention can have the following features.

That is, the spiral groove portion 62 of the viscoseal 32 may be formed on the outer peripheral surface 52 of the rotor shaft 21. With this configuration, the rotation of the rotor shaft 21 causes the flow of fluid from the rotor chamber 15 side to the bearings 22 side to occur, and thus the lubricating oil leaking from the viscoseal 32 to be reliably returned to the viscoseal 32.

The wall portion 82 and the annular groove 83 are formed on the inner peripheral surface 51 of the oil seal 31 in order in the axial direction from the inner peripheral boundary portion 58 toward the bearings 22, and the oil seal-side end 73 may be arranged so as to face the annular groove 83. With this configuration, the lubricating oil pushed back toward the viscoseal 32 along the return inclined surface 71 temporarily flows into the annular groove 83 and is stored therein, so that it becomes difficult for the lubricating oil to return to the atmosphere communication space 55 separated by the wall portion 82, and the lubricating oil is more reliably returned to the viscoseal 32.

The annular groove 83 may include an annular inclined surface 85 inclined so as to decrease in diameter radially inward on a side closer to the bearing 22. With this configuration, when the rotor shaft 21 rotates, the annular inclined surface 85 guides the lubricating oil flowing into the annular groove 83 so that the lubricating oil flows toward the bearing 22 along the annular inclined surface 85. As a result, the lubricating oil is easily returned to the bearing 22.

The spiral groove portion 62 of the viscoseal 32 may be formed on a sleeve outer peripheral surface 53 of a sleeve 57 configured to be attachable to and detachable from the rotor shaft 21. With this configuration, a metallic material, which is easily subjected to cutting processing for the fine spiral groove portion 62, can be used as the sleeve 57, and the machining cost of the spiral groove portion 62 can be reduced.

The spiral groove portion 62 of the viscoseal 32 may include a spiral inclined surface 65 inclined so as to expand in diameter radially outward on the side closer to the bearing 22. With this configuration, due to the action of centrifugal force when the rotor shaft 21 rotates, the spiral inclined surface 65 causes the lubricating oil existing in the spiral groove portion 62 to flow toward the bearings 22 along the spiral inclined surface 65. As a result, the lubricating oil is easily returned to the bearing 22.

The oil seal-side end 73 of the oil return groove 21a may be arranged at a position closer to the bearing 22 by a distance of at least 1 mm from the inner peripheral boundary portion 58. With this configuration, the oil seal-side end 73 can reliably be positioned closer to the discharge-side bearings 22 than the inner peripheral boundary portion 58 despite the assembly tolerance and the like of the discharge-side shaft seal device 30.

In addition, the oil-free screw compressor 1 according to the present invention may be configured as follows.

That is, the oil-free screw compressor 1 according to the present invention includes: a screw rotor 16 accommodated in a rotor chamber 15 of a casing of a compressor, a bearing 22 configured to support a rotor shaft 21 of the screw rotor, a shaft seal device 30 provided in a shaft seal space 10 of the casing, the shaft seal space 10 being formed between the rotor chamber 15 and the bearing 22, the shaft seal device 30 including a viscoseal 32 arranged at a position closer to the bearing 22 and a gas seal portion 44 arranged at a position closer to the rotor chamber 15, an atmosphere communication space 55 formed between the viscoseal 32 of the shaft seal device 32 and the gas seal portion 44, and an oil return groove 21a formed on the rotor shaft 21, the oil return groove 21a including a return inclined surface 71 inclined so as to expand in diameter radially outward from an end on a gas seal-side to a viscoseal-side end of the return inclined surface 71. An inner peripheral surface 51 of the shaft seal device 30 includes an inner peripheral boundary portion 58 that defines a part of the atmosphere communication space 55 on a side closer to the gas seal portion 44 in the atmosphere communication space 55. A return inclined surface 71 of the oil return groove 21a overlaps the inner peripheral surface 51 positioned closer to the bearing 22 than the inner peripheral boundary portion 58.

With the above configuration, the inclined surface 71 of the oil return groove 21a overlaps the inner peripheral surface 51 positioned closer to the bearing 22 than the inner peripheral boundary portion 58, whereby the oil return groove 21a can guide the lubricating oil leaking from the viscoseal 32 into the spiral groove portion 62 of the viscoseal 32. Therefore, the oil return groove 21a can reliably return the lubricating oil leaking from the viscoseal 32 toward the atmosphere communication space 55 to the viscoseal 32.

In addition to the above features, the oil-free screw compressor 1 according to the present invention can have the following features.

That is, the spiral groove portion 62 of the viscoseal 32 may be formed on the inner peripheral surface 51 of the shaft seal device 30 on the side facing the outer peripheral surface 52 of the rotor shaft 21. With this configuration, the lubricating oil can be directly guided from the oil return groove 21a to the spiral groove portion 62.

Furthermore, the wall portion 82, the annular groove 83, and the spiral groove portion 62 may be formed on the inner peripheral surface 51 of the shaft seal device 30 in order in the axial direction from the inner peripheral boundary portion 58 toward the bearing 22. With this configuration, the lubricating oil pushed back toward the viscoseal 32 along the return inclined surface 71 temporarily flows into the annular groove 83 and is stored therein, so that it becomes difficult for the lubricating oil to return to the atmosphere communication space 55 separated by the wall portion 82, and the lubricating oil is more reliably returned to the viscoseal 32.

The invention claimed is:

1. An oil-free screw compressor comprising:
    a screw rotor accommodated in a rotor chamber of a casing of the compressor;
    a bearing configured to support a rotor shaft of the screw rotor;
    a shaft seal device arranged in a shaft seal space of the casing, the shaft seal space being formed between the rotor chamber and the bearing, the shaft seal device including an oil seal arranged at a position closer to the bearing and a gas seal arranged at a position closer to the rotor chamber;
    an atmosphere communication space formed between an oil seal portion formed in any one of the oil seal and the rotor shaft and a gas seal portion of the gas seal, the atmosphere communication space communicating with an atmosphere communication hole; and
    an oil return groove formed on the rotor shaft, the oil return groove including a return inclined surface inclined so as to expand in diameter radially outward from a gas seal-side end to an oil seal-side end of the return inclined surface,
    wherein the oil seal portion is a viscoseal including a spiral groove portion,
    wherein an inner peripheral surface of the oil seal includes an inner peripheral boundary portion that defines a part of the atmosphere communication space, on a side closer to the bearing in the atmosphere communication space, and
    wherein the oil seal-side end of the oil return groove is arranged in a vicinity of the inner peripheral boundary portion and at a position closer to the bearing than the inner peripheral boundary portion.

2. The oil-free screw compressor according to claim 1, wherein the spiral groove portion of the viscoseal is formed on an outer peripheral surface of the rotor shaft.

3. The oil-free screw compressor according to claim 2,
    wherein a wall portion and an annular groove are formed on an inner peripheral surface of the oil seal in order in an axial direction from the inner peripheral boundary portion toward the bearing, and
    wherein the oil seal-side end is arranged so as to face the annular groove.

4. The oil-free screw compressor according to claim 3, wherein the annular groove includes an annular inclined surface inclined so as to decrease in diameter radially inward on a side closer to the bearing.

5. The oil-free screw compressor according to claim 1, wherein the spiral groove portion of the viscoseal is formed on a sleeve outer peripheral surface of a sleeve configured to be attachable to and detachable from the rotor shaft.

6. The oil-free screw compressor according to claim 1, wherein the spiral groove portion of the viscoseal includes a spiral inclined surface inclined so as to expand in diameter radially outward on a side closer to the bearing.

7. The oil-free screw compressor according to claim 1, wherein the oil seal-side end of the oil return groove is arranged at a position closer to the bearing by a distance of at least 1 mm from the inner peripheral boundary portion.

8. An oil-free screw compressor comprising:
    a screw rotor accommodated in a rotor chamber of a casing of the compressor;
    a bearing configured to support a rotor shaft of the screw rotor;
    a shaft seal device provided in a shaft seal space of the casing, the shaft seal space being formed between the rotor chamber and the bearing, the shaft seal device including a viscoseal arranged at a position closer to the bearing and a gas seal portion arranged at a position closer to the rotor chamber;

an atmosphere communication space formed between the viscoseal of the shaft seal device and the gas seal portion; and an oil return groove formed on the rotor shaft, the oil return groove including a return inclined surface inclined so as to expand in diameter radially outward from a gas seal-side end to a viscoseal-side end of the return inclined surface, wherein an inner peripheral surface of the shaft seal device includes an inner peripheral boundary portion that defines a part of the atmosphere communication space on a side closer to the viscoseal in the atmosphere communication space, and wherein a return inclined surface of the oil return groove overlaps the inner peripheral surface positioned closer to the bearing than the inner peripheral boundary portion.

9. The oil-free screw compressor according to claim 8, wherein a spiral groove portion of the viscoseal is formed on an inner peripheral surface of the shaft seal device on a side facing an outer peripheral surface of the rotor shaft.

10. The oil-free screw compressor according to claim 9, wherein a wall portion, an annular groove, and the spiral groove portion are formed on an inner peripheral surface of the shaft seal device in order in an axial direction from the inner peripheral boundary portion toward the bearing.

* * * * *